Oct. 19, 1971 A. W. SPENCER 3,613,182
TENTER CLAMP POSITIONING RIDGE
Filed April 13, 1970
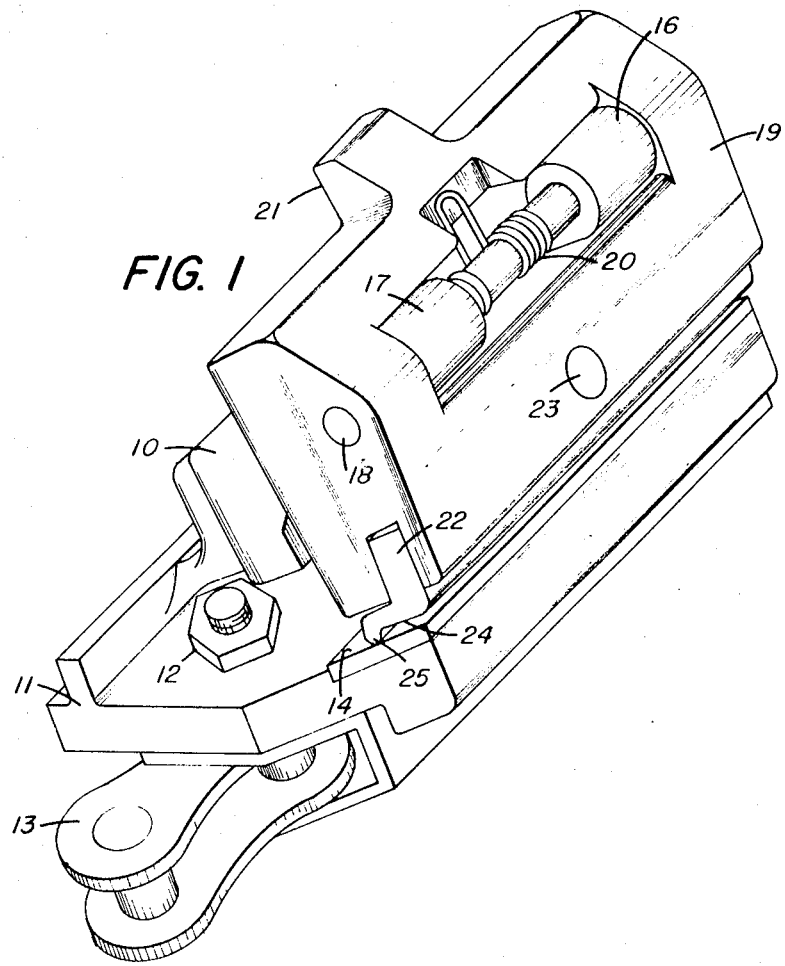
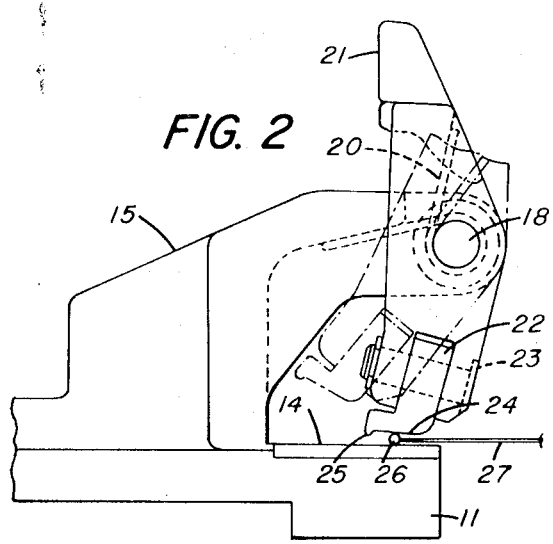
ARTHUR W. SPENCER
INVENTOR.
BY
ATTORNEY

United States Patent Office 3,613,182
Patented Oct. 19, 1971

3,613,182
TENTER CLAMP POSITIONING RIDGE
Arthur W. Spencer, 1669 Lake Ave.,
Rochester, N.Y. 14650
Filed Apr. 13, 1970, Ser. No. 27,852
Int. Cl. A44b 21/00; D06c 3/02, 3/10
U.S. Cl. 24—253
4 Claims

ABSTRACT OF THE DISCLOSURE

A device for the tentering of ribbed-edge plastic films. The device comprises a tenter clamp having a generally C-shaped first member bearing a rib-supporting surface. A second member is pivotally connected to the first member and bears a rib-contacting surface so disposed as to coact with the rib-supporting surface in a clamping engagement. In operation, the ribbed edge of the film is clamped between the two surfaces in such a manner that the sheet-like web portion of the film is not contacted. Proper clamping engagement is insured by a positioning ridge formed co-extensively with the trailing edge of the rib-contacting surface. The clamp is so constructed that lateral tension exerted on the film during tentering will cause the clamp to exert increased clamping force on the rib.

BACKGROUND OF THE INVENTION

Field of the invention

This invention relates in general to tenter clamps designed for use in the lateral tentering or stretching of plastic films of the type having a sheet-like web portion and ribbed or beaded parallel longitudinal edges, and in particular the invention relates to an improved form of self-locking tenter clamp designed to eliminate contact with the web portion of the film. This invention comprises a modification of the tenter clamp described and claimed in co-pending application, Ser. No. 28,358, entitled "Self-Locking Tenter Clamp for Direct Rib Gripping," filed simultaneously herewith in the names of Thomas H. Grove, Harry C. Roberts and Edward W. Smith, Jr., and assigned to the assignee of the instant application.

The prior art

The prior art is replete with tentering devices for use with such films and over which this invention is an improvement; the invention providing both more efficient tentering action and a reduction in film wastage.

The tentering devices disclosed by the prior art fall basically into two classes: those which employ a clamping action through the use of at least one moveable member, and those employing guide rails or slotted plates along which the film is forced to slide.

Devices contained within the first class are of a design somewhat similar to the instant invention, however, these devices are designed for gripping the web portion of the film and are not suitable for engaging only the ribs thereof. Any type of tentering device which grips the web portion, whether or not it also grips the rib, will mar the web surface, thereby necessitating the trimming of the marred portion from the finished product. Devices of the second class above described rely on a sliding contact with the ribs in order to guide the film edges during the tentering operation. Such sliding contact generates frictional forces which wear away the plastic material and may even sever the rib from the web. Heat generated by such friction causes uneven elongation of the film edges which in turn causes the film to become canted with respect to the guide members with a resultant jamming of the tentering machinery.

A disadvantage common to both of the aforesaid classes of tentering devices resides in the fact that their use causes contamination of the web. A device of the clamping variety which engages the web portion tends to skim off particles of the rib as the film leaves its grasp, because of the tendency of the web and attached rib to curl up inside the clip. A device utilizing a sliding contact similarly tends to shave off particles of those areas of the film which rub along the surfaces of the tentering device. Contamination results in both cases because the plastic particles become scattered across the web, thereby reducing the quality of the finished product and necessitating a separate cleaning operation.

It will, therefore, be appreciated that the development of a tentering device for use with ribbed-edge plastic film, which device will provide reliable film engagement and also reduce both film wastage and contamination, represents a significant advance in the art.

SUMMARY OF THE INVENTION

It is accordingly an object of this invention to provide a tenter clamp designed for use in the tentering of plastic films of the type having a web and ribbed longitudinal edges, which clamp includes cooperating surfaces designed to clamp firmly only the ribbed edge of the film therebetween.

It is another object of this invention to provide such a tenter clamp which is designed to clamp a ribbed edge of the film with increased force as lateral tension is applied to the film.

It is a further object of this invention to provide such a tenter clamp which is designed to firmly clamp a rib of the film while maintaining the clamping surfaces of said device out of contact with the web.

It is a still further object of this invention to provide such a tenter clamp which is designed to firmly clamp only the rib of the film and to allow release of clamping engagement at the end of the tentering operation with a minimum amount of abrasion of the film material.

These and other objects are attained in accordance with the invention by providing a tenter clamp comprising two jaw members, pivotally connected one to another, each of which bears a generally planar clamping surface, which surfaces coact to firmly clamp a ribbed edge of a plastic film disposed therebetween, while the surfaces are continuously maintained out of contact with the web portion of the film.

BRIEF DESCRIPTION OF THE DRAWING

Further objects and advantages of the invention will be apparent from the following description taken in conjunction with the accompanying drawings wherein similar reference numerals indicate corresponding parts in both figures.

FIG. 1 is a perspective view of the tenter clamp described herein.

FIG. 2 is a fragmentary side view of the clamp shown in FIG. 1 depicting the tenter clamp in a clamping engagement with a ribbed film edge, and further showing a dot and ash representation of the clamp in an open or inactive position.

DESCRIPTION OF THE PREFERRED EMBODIMENTS

The tenter clamp herein described comprises a link in an endless tenter clamp chain which is driven by a suitable power source. As is conventional (see, for example, U.S. Pat. No. 2,896,262), the film to be tentered continuously travels between two of such chains arranged at opposite edges of the film and diverging with respect to the longitudinal centerline of the film; their divergence being in the direction of film travel.

Referring now to FIG. 1, the tenter clamp is comprised of a generally C-shaped first jaw member 10, having a generally horizontal lower arm or base 11 which carries mounting apparatus 12 for securing the tenter clamp to a connecting link 13 in the tenter chain, and which base also bears an upward-facing, substantially planar, rib-supporting surface 14. Rising from base 11 is an arched portion 15 the free end, or upper arm, of which generally overlies the rib-supporting surface 14 and is formed into two ears 16 and 17, which are provided with aligned bores adapted to receive a pivot pin 18. A second jaw member 19 is mounted on pivot pin 18 and is free to pivot about the axis of the pin in a limited arc. Also mounted on pivot pin 18 is a spring 20 designed to urge the second jaw member 19 counterclockwise toward its operating range as shown in solid lines in FIG. 2. The second jaw member 19 bears upon its upper extremity a laterally-facing camming surface 21 designed, as is conventional, to contact camming means (not shown) used to force the second jaw member clockwise into the open or inactive position as shown by the dot and dashed lines in FIG. 2. The lower extremity of the second jaw member 19, which is more clearly shown in FIG. 2, is suitably formed to receive a blade 22 affixed thereto by a centrally positioned pin 23 designed to allow a slight rocking movement of the blade about the pin 23. The blade 22 is generally L-shaped in cross-section and extends across the full length of the rib-supporting surface 14. That portion of the blade 22 generally facing the rib-supporting surface 14 comprises a substantially planar rib-contacting surface 24.

It should be understood that to this point the instant disclosure corresponds with that of the aforesaid co-pending application. The invention herein disclosed and claimed comprises a tenter clamp as hereinbefore described wherein the trailing edge of the rib-contacting surface 24 terminates in and is co-extensive with a lobate positioning ridge 25.

The axis of pivot of the second jaw member 19 and its attached pivot pin 18 is so disposed that a line passing through the axis and perpendicular to the plane defined by rib-supporting surface 14 will be laterally spaced from surface 14 in the direction of movement of the second jaw member 19 from its inactive position to its operating range; furthermore, the distance between said axis and the plane of surface 14 as measured on said line is less than the shortest distance from the axis to the lowermost extremity of positioning ridge 25 so that the latter will limit the counterclockwise travel of the second jaw member 19.

It will be appreciated by one skilled in the art that, while the description herein sets forth the best mode contemplated for carrying out the invention, words referring to orientation, such as, for example, "upper" or "horizontal," are used herein for illustrative purposes only, and are not intended to restrict the actual operating orientation of the invention.

OPERATION

In operation, the rib-contacting surface 24 coacts with the rib-supporting surface 14 to firmly clamp a ribbed film edge and thereby prevent relative movement between the rib and the tenter clamp during tentering. FIG. 2 shows this clamping engagement between the tenter clamp and one ribbed film edge 26 of a plastic film strip which includes web portion 27. Prior to engaging the film, the tenter clamp is held, as shown in the dot and dash representation of FIG. 2, in an open or inactive position by the above mentioned camming means (not shown) engaging the camming surface 21. While in said inactive position, the rib-contacting surface 24 and the rib-supporting surface 14 are spaced, throughout their extent, from one another a distance which is greater than the maximum thickness of a rib to be clamped. As the tenter clamp is brought into longitudinal alignment with a segment of the film to be tentered, and after a rib of said film is positioned above the rib-supporting surface 14, said camming engagement is then released, and the second jaw member 19 bearing the rib-contacting surface 24 is urged by means of spring 20 into its operating range wherein surfaces 14 and 24 respectively engage the rib at substantially diametrically opposite areas thereof as shown in FIG. 2. For most effective operation, the width of the rib-contacting surface 24 should be a multiple of at least three, and preferably at least five, times the thickness or diameter (as measured generally perpendicular to the plane of the web portion of the film) of the largest rib to be engaged. This extended width of the rib-contacting surface 24 assists in insuring rib engagement by increasing the limits of the area within which a rib must be placed in order for clamping engagement to occur.

Rib engagement is further insured by the presence of positioning ridge 25 formed along the trailing edge of rib-contacting surface 24 and co-extensive therewith. The positioning ridge is lobate in shape and projects generally toward the rib-supporting surface 14 as shown in FIGS. 1 and 2. Should the rib be initially positioned too far inside the clamp to be engaged by the rib-contacting surface 24 as it moves toward its operating range, the projecting positioning ridge 25 will engage the rib to prevent said surface from overswinging the rib and thereby contacting the web. The second jaw member 19 is thus held momentarily out of the operating range until the tenter clamp's divering path of travel with respect to the film brings the clamp into proper position for rib engagement by rib-contacting surface 24.

The presence of a rib in simultaneous contact with the rib-supporting surface 14 and the rib-contacting surface 24 will cause said surfaces to be held in a position wherein they diverge relative to one another at an acute angle in a direction opposite that of the movement of the second jaw member 19 from its inactive position to its operating range, so as to form a wedge tending to restrict lateral movement of the rib positioned therein. As a lateral tentering force is applied to the film, any resultant lateral rib movement will cause the tenter clamp to become firmly locked to the ribbed edge of the film. This self-locking feature is made possible by the fact that during the simultaneous engagement of jaw members 10 and 19 with a ribbed film edge which is positioned between their respective rib clamping surfaces 14 and 24, the pivot pin 18 remains laterally displaced from that portion of the rib-supporting surface 14 occupied by said ribbed edge, with the lateral displacement being in the direction of convergence of the aforesaid acute angle. This arrangement assures that any lateral rib movement resulting from the application of tentering force will, because of the wedging action provided by the acute angle, cause the second jaw member 19 to pivot in the direction of rib movement. This pivotal movement will because of the placement of the pivot pin 18, always contain a downward component thereby causing the device to clamp with increased force until the ribbed edge becomes firmly locked in place. Because of their construction and disposition relative to one another the rib-supporting surface 14 and the rib-contacting surface 24 are continuously maintained out of contact with the web portion of the film during clamping engagement with a ribbed edge, as well as during movement into and out of such engagement, regardless of how firmly the rib is clamped or where it is positioned upon the clamping surfaces.

From the foregoing it should be apparent that, just as there is always a downward component of movement as the rib-contacting surface 24 pivots counterclockwise into clamping engagement, so will there also be an upward component as the surface is released from clamping engagement and pivoted clockwise into the open or inactive position. This upward component in combination with the substantially planar construction of the rib-contacting surface 24 and the rib-supporting surface 14 greatly minimizes the skimming of film particles from the rib surface as the rib leaves the grasp of the tenter clamp. It should be further apparent from the foregoing description that the instant invention does not subject the film to sliding contact during tentering, but instead engages with a firm clamping action applied solely to the rib, thereby eliminating damage to the web surface, minimizing damage to the ribbed edge, and substantially reducing contamination of the web surface.

The invention has been described in detail with particular reference to preferred embodiments thereof, but it will be understood that variations and modifications can be effected within the spirit and scope of the invention.

I claim:

1. A tenter clamp for gripping a rib of a film having a web and ribbed longitudinal edges; said tenter clamp comprising:

a first jaw member having a substantially planar, rib-supporting surface;

a second jaw member having a substantially planar rib-contacting surface generally facing said rib-supporting surface and terminating at one edge in a positioning ridge formed co-extensively therewith and projecting generally toward said rib-supporting surface;

said second jaw member being pivotally connected to said first jaw member for arcuate swinging movement about a predetermined axis from an inactive position wherein said rib-contacting surface and said rib-supporting surface are spaced, throughout their extent, from one another a distance greater than the maximum thickness of a rib to be clamped, and into an operating range wherein said surfaces are adapted to simultaneously engage a rib interposed therebetween;

said rib-contacting surface being so oriented relative to the axis and to said rib-supporting surface that when these surfaces are simultaneously in clamping contact with a rib disposed therebetween, said ridge will be positioned laterally outward of said rib, and said surfaces will be separated throughout their extent by a distance greater than the thickness of the web and will diverge relative to one another at an acute angle in a direction opposite that of said movement, so that displacement of said ribbed edge toward the apex of said acute angle will cause said second jaw member to pivot in the direction of rib displacement, thereby decreasing the distance between said surfaces, yet maintaining them out of contact with said web, and exerting an increased clamping force on said rib to oppose further movement thereof relative to said surfaces.

2. The invention of claim 4 wherein a line passing through said axis and perpendicular to the plane defined by said rib-supporting surface will be laterally displaced from said rib-supporting surface in the direction of movement of said second jaw member from said inactive position to said operating range.

3. The invention of claim 4 wherein the width of said rib-contacting surface is a multiple of at least three times the length of the diameter of said rib as measured generally perpendicular to the plane of said web.

4. A tenter clamp for clamping a film having a web and a pair of ribs extending respectively along opposite longitudinal edges thereof; said tenter clamp comprising:

a generally C-shaped first jaw member bearing upon the inner urface of one arm thereof a substantially planar rib-supporting surface;

a second jaw member connected to the terminal portion of the opposite arm of said first jaw member for movement in a limited arc about an axis;

said second jaw member bearing a substantially planar rib-contacting surface generally facing said rib-supporting surface and terminating at one edge in a positioning ridge formed co-extensively therewith and projecting generally toward said rib-supporting surface;

said rib-contacting surface being so oriented relative to said axis and to said rib-supporting surface that when these surfaces are in simultaneous clamping contact with a rib disposed therebetween, said ridge will be positioned laterally outward of said rib, and said surfaces will be separated throughout their extent by a distance greater than the thickness of the web and will diverge relative to one another at an acute angle toward that portion of said C-shaped first jaw member which connects said arms, so that displacement of said rib toward the apex of said acute angle will cause said second jaw member to pivot in the direction of rib displacement thereby decreasing the distance between said surfaces, yet maintaining them out of contact with said web, and exerting an increased clamping force on said rib to oppose further displacement thereof relative to said surfaces.

References Cited

UNITED STATES PATENTS

| | | | |
|---|---|---|---|
| 2,896,262 | 7/1959 | Herrmann | 18—48 |
| 3,104,444 | 9/1963 | Nash | 26—62 |
| 3,132,375 | 5/1964 | Koppehele | 18—1 |
| 3,014,234 | 12/1961 | Koppehele | 18—1 |
| 3,000,073 | 9/1961 | Zuck et al. | 26—62 |

PAUL R. GILLIAM, Primary Examiner

U.S. Cl. X.R.

18—1; 26—61, 62

PO-1050
(5/69)

UNITED STATES PATENT OFFICE
CERTIFICATE OF CORRECTION

Patent No. 3,613,182          Dated October 19, 1971

Inventor(s) Arthur W. Spencer      U. S. Ser.No. 27,852

It is certified that error appears in the above-identified patent and that said Letters Patent are hereby corrected as shown below:

Please insert --- "Eastman Kodak Company - Assignee" in this patent.

Column 6, line 11, change the word "urface" to "surface".

Signed and sealed this 28th day of March 1972.

(SEAL)
Attest:

EDWARD M. FLETCHER, JR.        ROBERT GOTTSCHALK
Attesting Officer                Commissioner of Patents